United States Patent
Wong-Campos et al.

(10) Patent No.: US 11,322,343 B2
(45) Date of Patent: May 3, 2022

(54) OPTICAL ALIGNMENT USING REFLECTIVE DOVE PRISMS

(71) Applicant: IonQ, Inc., College Park, MD (US)

(72) Inventors: Jaime David Wong-Campos, Hyattsville, MD (US); Kai Hudek, Hyattsville, MD (US); Shantanu Debnath, College Park, MD (US)

(73) Assignee: IONQ, INC., College Park, MD (US)

( * ) Notice: Subject to any disclaimer, the term of this patent is extended or adjusted under 35 U.S.C. 154(b) by 195 days.

(21) Appl. No.: 16/903,174

(22) Filed: Jun. 16, 2020

(65) Prior Publication Data

US 2021/0013020 A1    Jan. 14, 2021

Related U.S. Application Data

(60) Provisional application No. 62/871,880, filed on Jul. 9, 2019.

(51) Int. Cl.
| | |
|---|---|
| *H01J 49/42* | (2006.01) |
| *G06N 10/00* | (2022.01) |
| *B82Y 10/00* | (2011.01) |

(52) U.S. Cl.
CPC ............ *H01J 49/422* (2013.01); *G06N 10/00* (2019.01); *B82Y 10/00* (2013.01)

(58) Field of Classification Search
CPC ................................ G06N 10/00; B82Y 10/00
USPC .................................................. 250/251, 290
See application file for complete search history.

(56) References Cited

U.S. PATENT DOCUMENTS

| | | | | |
|---|---|---|---|---|
| 5,742,387 | A * | 4/1998 | Ammann | G01C 15/004 33/290 |
| 9,319,638 | B1 * | 4/2016 | Baudat | G02B 27/141 |
| 2002/0085806 | A1 * | 7/2002 | Pezeshki | H01S 5/4031 372/109 |
| 2012/0325314 | A1 * | 12/2012 | Cheung | F03G 6/067 60/641.11 |
| 2013/0088709 | A1 * | 4/2013 | Koenig | G01J 1/4257 356/72 |
| 2019/0219811 | A1 * | 7/2019 | Keller | G02B 27/0025 |

* cited by examiner

*Primary Examiner* — Nicole M Ippolito
(74) *Attorney, Agent, or Firm* — Arentfox Schiff LLP

(57) ABSTRACT

Aspects of the present disclosure describe techniques for optical alignment using a reflective dove prism. For example, a system for optical alignment is described that includes an assembly having a housing with three separate, reflecting structures positioned to produce three reflections of one or more laser beams or one or more images, and a controller configured to control a rotation of the assembly about a pivot point to produce a tilt in orientation of the one or more lasers beams or the one or more images that is twice an angle of rotation of the assembly. Another system and a method for aligning laser beams using a housing with three separate, reflecting structures in a trapped ion quantum information processing (QIP) system are also described.

21 Claims, 7 Drawing Sheets

OPTICAL ALIGNMENT USING REFLECTIVE DOVE PRISMS

CROSS REFERENCE TO RELATED APPLICATION

This application claims the benefit of U.S. Provisional Application Ser. No. 62/871,880, entitled "Optical Alignment Using Reflective Dove Prisms" and filed on Jul. 9, 2019, which is expressly incorporated by reference herein in its entirety.

BACKGROUND

Aspects of the present disclosure relate generally to optical alignment, and more specifically, to techniques for alignment of laser beams by using a reflective Dove prism.

Continuous rotation of an input beam or image is often achieved through the use of Dove prisms, which are solid pieces of glass shaped as isosceles trapezoids that invert and rotate an image or beam using the principle of refraction. Such optical elements are not ideal for ultraviolet (UV) applications, like quantum information processing (QIP) applications, for example, since they require long propagations (on the order of several millimeters) of the light inside the material of the prism and that can lead to significant power loss and damage.

In general, shaping, control and steering of high power UV laser beams require optical elements that have adequate characteristics to handle both degradation and loss. In bulk materials, shorter wavelengths exacerbate element auto fluorescence and absorption from the media material, leading to extra loss and mode shape distortion.

Accordingly, for high power UV laser beam applications, it is desirable to have optical elements that allow for the continuous rotation of an input beam or image without the drawbacks of refractive Dove prisms in terms of power loss and damage to the device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of this disclosure, a system for optical alignment is described that includes an assembly having a housing with three separate, reflecting structures positioned to produce three reflections of one or more laser beams or one or more images; and a controller configured to control a rotation of the assembly about a pivot point to produce a tilt of the one or more lasers beams or the one or more images that is twice an angle of rotation of the assembly.

In another aspect of this disclosure, a system for aligning laser beams in a trapped ion quantum information processing (QIP) system is described that includes optical sources configured to generate a linear array of laser beams, an assembly having a housing with three separate, reflecting structures positioned to produce three reflections of the linear array of laser beams, a controller configured to control a rotation of the assembly about a pivot point to produce a tilt of the linear array of laser beams that is twice an angle of rotation of the assembly, and a trap having a linear array of ions, wherein the tilted linear array of laser beams is such that the linear array of laser beams align to the linear array of ions.

In another aspect of this disclosure, a method for aligning laser beams in a trapped ion quantum information processing system is described that includes receiving a linear array of laser beams at an assembly, the assembly having a housing with three separate, reflecting structures positioned to produce three reflections of the linear array of laser beams; and adjusting a rotation of the assembly about a pivot point to produce a tilt of the linear array of laser beams that is twice an angle of rotation of the assembly, wherein the tilted linear array of laser beams is such that the linear array of laser beams align to a linear array of ions in a trap in the quantum information processing system.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

As described above, for high power UV laser beam applications, it is desirable to have optical elements that allow for the continuous rotation of an input beam or image without the drawbacks of refractive Dove prisms in terms of power loss and damage to the device. The present disclosure addresses the issue of rotating a high power UV image or laser beam by mimicking the functionality of a refractive Dove prism with reflective elements only, allowing high input optical powers, broadband functionality, and decrease of optical power loss.

Figure 1:
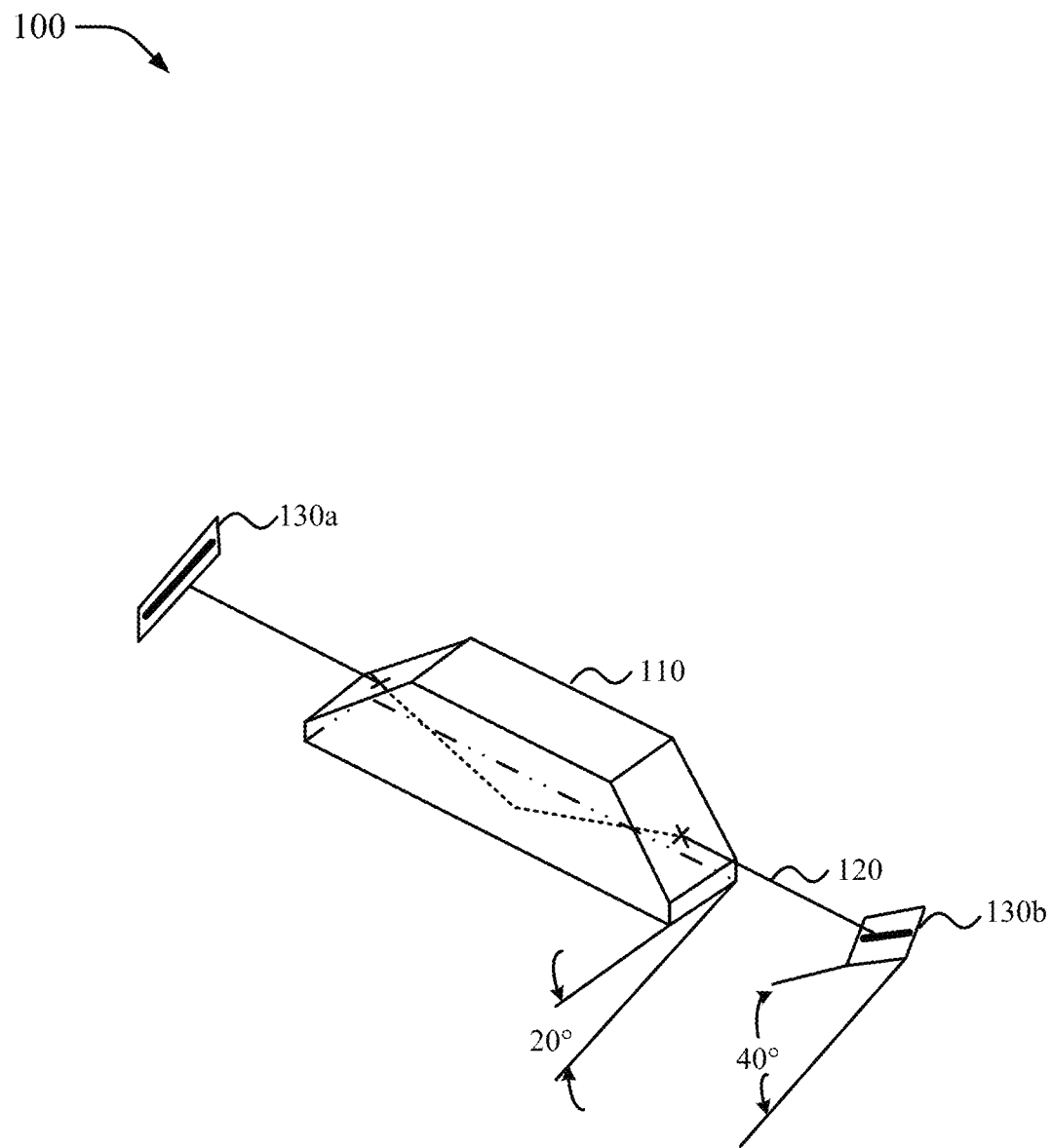
FIG. 1 illustrates an example of a refractive Dove prism in accordance with aspects of the disclosure.

FIG. 1 shows a diagram 100 that illustrates an example of a refractive Dove prism 110 in accordance with aspects of the disclosure. The prism 110 rotates an input beam or image 130a through refraction of the glass interface and reflection at a critical angle. As shown in the diagram 100, the prism 110 produces a rotated or tilted version of the input beam or image 130a, an output beam or image 130b, along a same propagation axis 120 of the input beam or image 130a. The amount of rotation or tilting that is provided is proportional to the amount that the prism 110 itself is rotated. For example, the amount of rotation is proportional to twice the amount that the prism 110 is rotated. As shown in this example, a rotation of 20 degrees (20°) of the prism 110 results in the output beam or image 130b to be rotated by 40 degrees (40°) relative to the input beam or image 130a.

The prism 110 operates based on refraction, which is the change in direction of light passing from one medium to another or from a gradual change in the medium. Optical prisms, such as the prism 110, use refraction to redirect the light. As mentioned above, because the light (e.g., a beam or image) has to go through the prism material as a result of refraction, when the light is from a high-power UV laser beam, this is likely to cause power loss and material damage.

Figure 2:
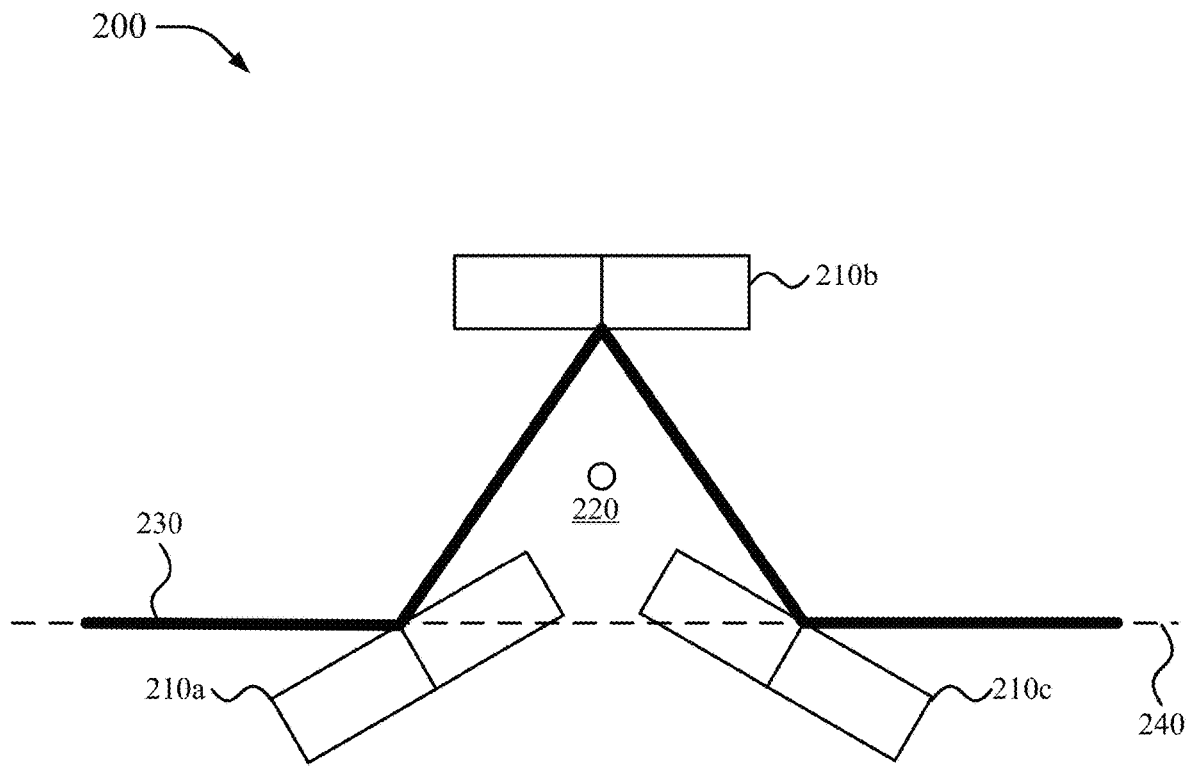
FIG. 2 illustrates an example of reflecting structures to reproduce the functionality of a refractive Dove prism in accordance with aspects of the disclosure.

FIG. 2 shows a diagram 200 that illustrates an example of reflective elements or structures (e.g., mirrors) to reproduce the functionality of a refractive Dove prism (e.g., the prism 110) in accordance with aspects of the disclosure. In contrast to refractive optics, the use of reflective optics involves a change in direction of light at an interface between two different media so that the light returns into the medium from which it originated. In reflective optics the light need not enter the second medium for it to change its trajectory.

In the example in the diagram 200, an input beam 230 (or input image) is directed to a first reflective structure 210a, is reflected from the first reflected structure 210a towards a second reflective element 210b, where it is again reflected towards a third reflective structure 210c, where it once again is reflected in a direction of a propagation axis 240 of the original input beam 230. The first reflective structure 210a and the third reflective structure 210c are angled with the same tilt respect the propagation axis 240. The second reflective structure 210b is essentially used to retro reflect the input beam 230 onto a third dimension to create the effect of a periscope. When the arrangement of the reflecting structures is rotated respect a centered pivot point 220, the input beam 230 is tilted by twice the rotation angle of the overall assembly. The rotation angle can be small, for example, the rotation angle can be less than 1 degree (1°). The rotation angle can be in a positive direction (e.g., in one direction) or a negative direction (e.g., in the opposite direction), and can range as high a 90 degrees (90°) in either direction. The rotation angle can be controlled with accuracy of, for example, a tenth of a degree (0.1°).

Figure 3:
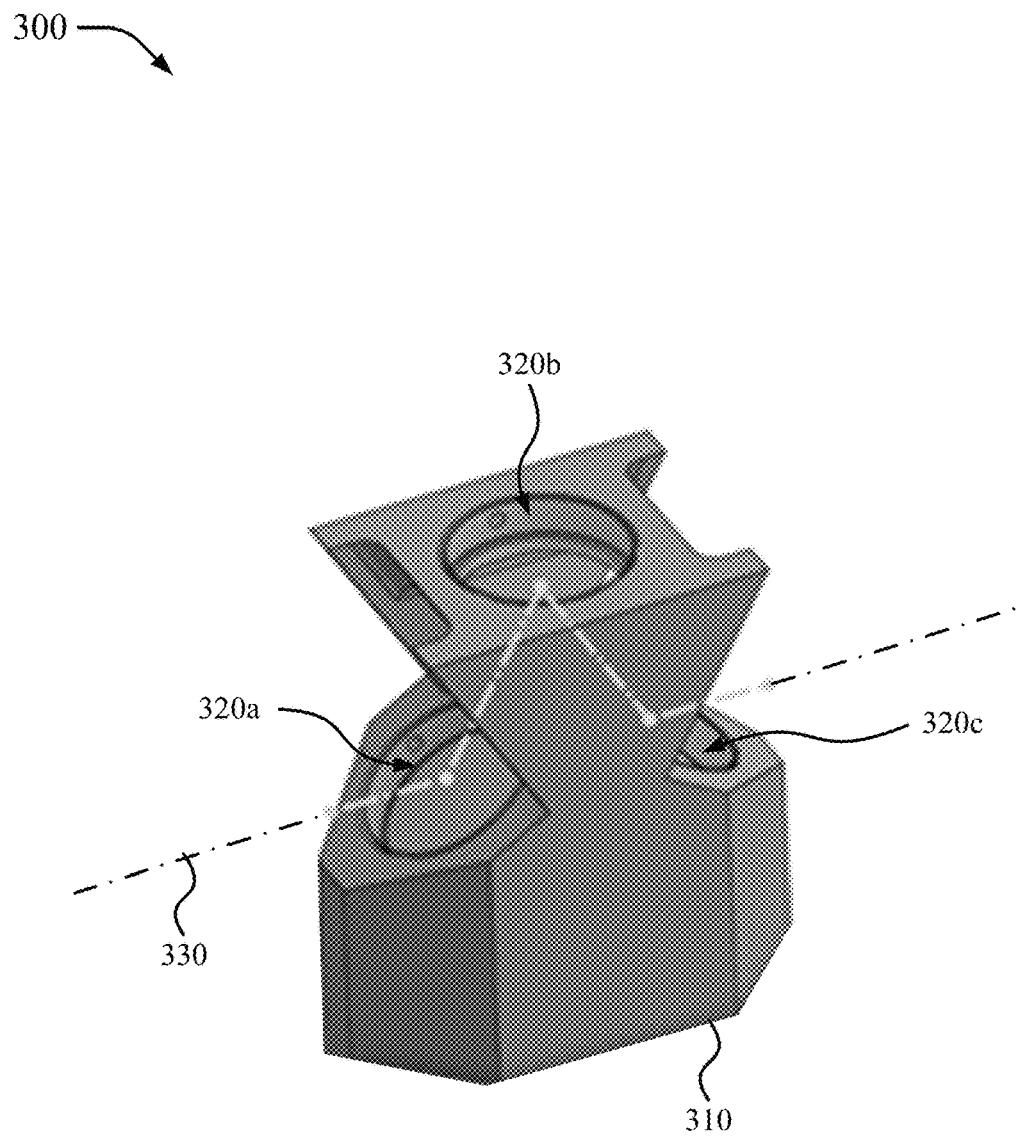
FIG. 3 illustrates an example of a system with a housing for the reflecting structures of FIG. 2 in accordance with aspects of the disclosure.

Now referring to FIG. 3, a diagram 300 is shown that illustrates a perspective view of a system or assembly with a housing 310 for setting or positioning the reflecting structures 210a, 210b, and 210c in the diagram 200 of FIG. 2. The input beam 330 (or input image) is directed toward a first reflective structure 320a. For example, the housing 310 may have a lower portion in which the first reflective structure 320a and the third reflective structure 320c are set at the right tilt or angle, and an upper portion in which the second reflective structure 320b is set. The reflecting structures being separate but embedded into the housing 310 may be made of different materials than a material used for making the housing 310. The housing 310 is also configured to provide a free path for the reflections to take place, unlike the prism 110 in which reflections take place inside the prism itself. It is to be understood that the housing 310 is provided by way of illustration and many different configurations, shapes, or form factors may be used to provide the same or similar functionality to that of the housing 310.

Figure 4A:
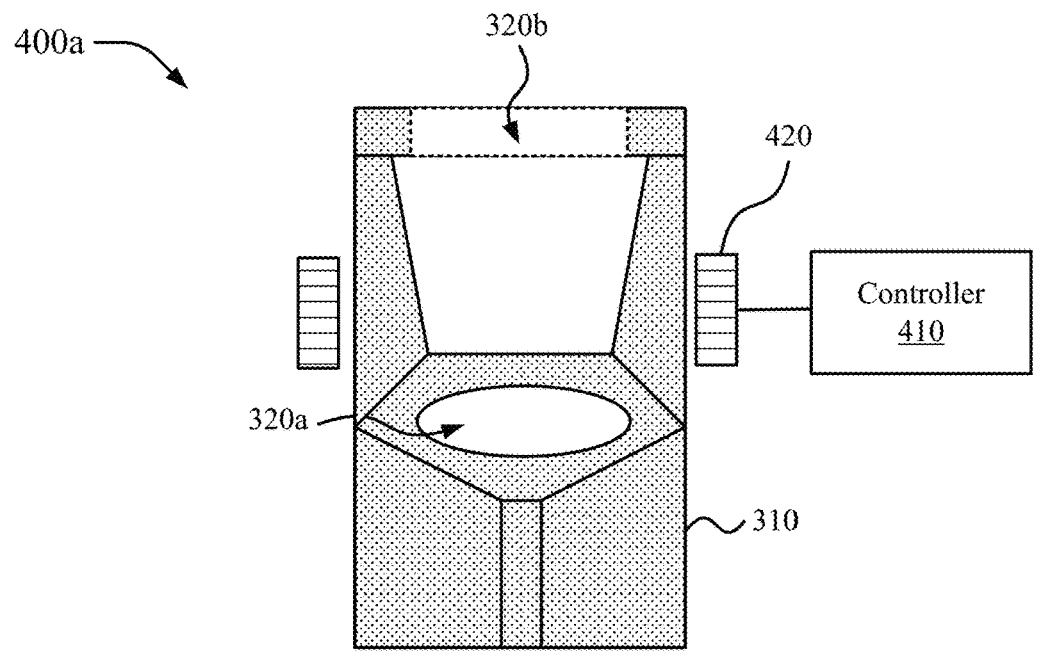
FIGS. 4A and 4B illustrate examples of controlling a rotation of the reflecting structures and the housing of FIG. 3 to produce a desirable amount of tilt in accordance with aspects of the disclosure.
Figure 4B:
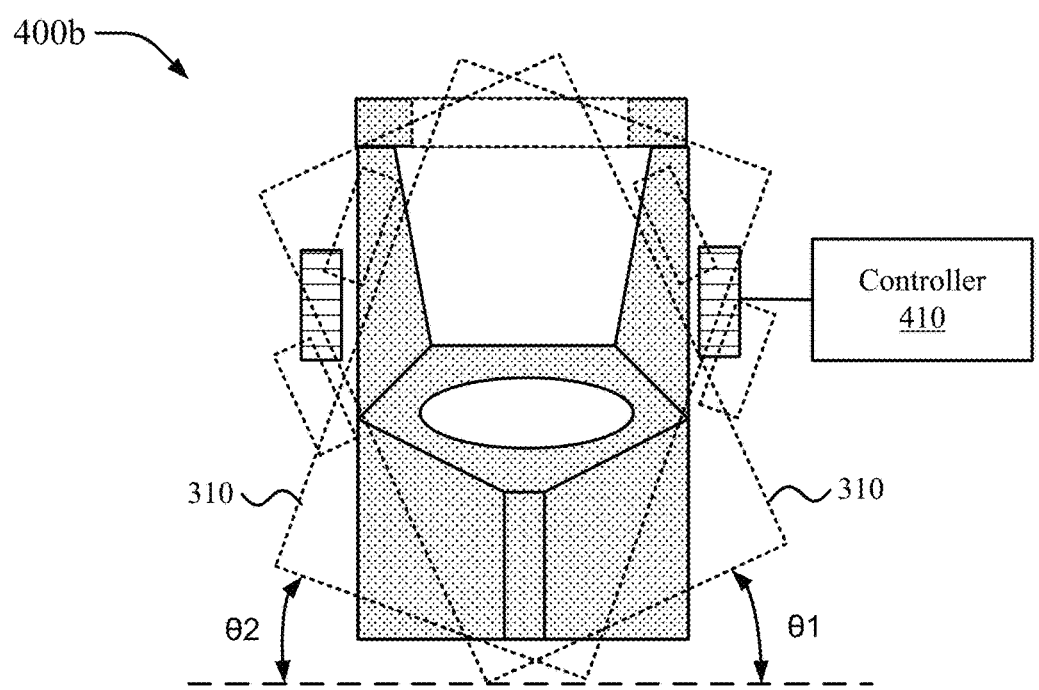

FIGS. 4A and 4B illustrate diagrams 400a and 400b, respectively, which are examples of controlling a rotation of the reflecting structures and the housing of FIG. 3 to produce a desirable amount of tilt in accordance with aspects of the disclosure. For example, the diagram 400a shows a front view of the housing 310 with the first reflective structure 320a showing in the bottom portion of the housing 310 (the third reflective structure 320c being in the back and not showing) and the second reflective structure 320b showing in the upper portion of the housing 310. A rotation mechanism 420 may be attached or coupled to the housing 310 at the appropriate pivot point to rotate the housing 310 along with the reflecting structures. Different mechanical structures may be used for the rotation mechanism 420. A controller 410 may be used to control the amount of rotation by the rotation mechanism 420 such that the appropriate tilt is provided to an input laser beam or image. For example, if the input laser beam or image needs to be rotated by 1 degree (1°), the controller 410 may generate signals to control the operation of the rotation mechanism 420 so that it will rotate or tilt the housing 310 with the reflecting structures 320a, 320b, and 320c by 0.5 degrees (0.5°).

The diagram 400b shows that the controller 410 and the rotation mechanism 420 can be used to rotate or tilt the housing 310 with the reflecting structures 320a, 320b, and 320c in one direction (e.g., by an angle θ1) or in the opposite direction (e.g., by an angle θ2). Although in most instances the total amount of rotation may be small, the controller 410 and the rotation mechanism 420 may be used for rotations or tilts of as much as 90 degrees (90°) or greater, for example.

Figure 5:
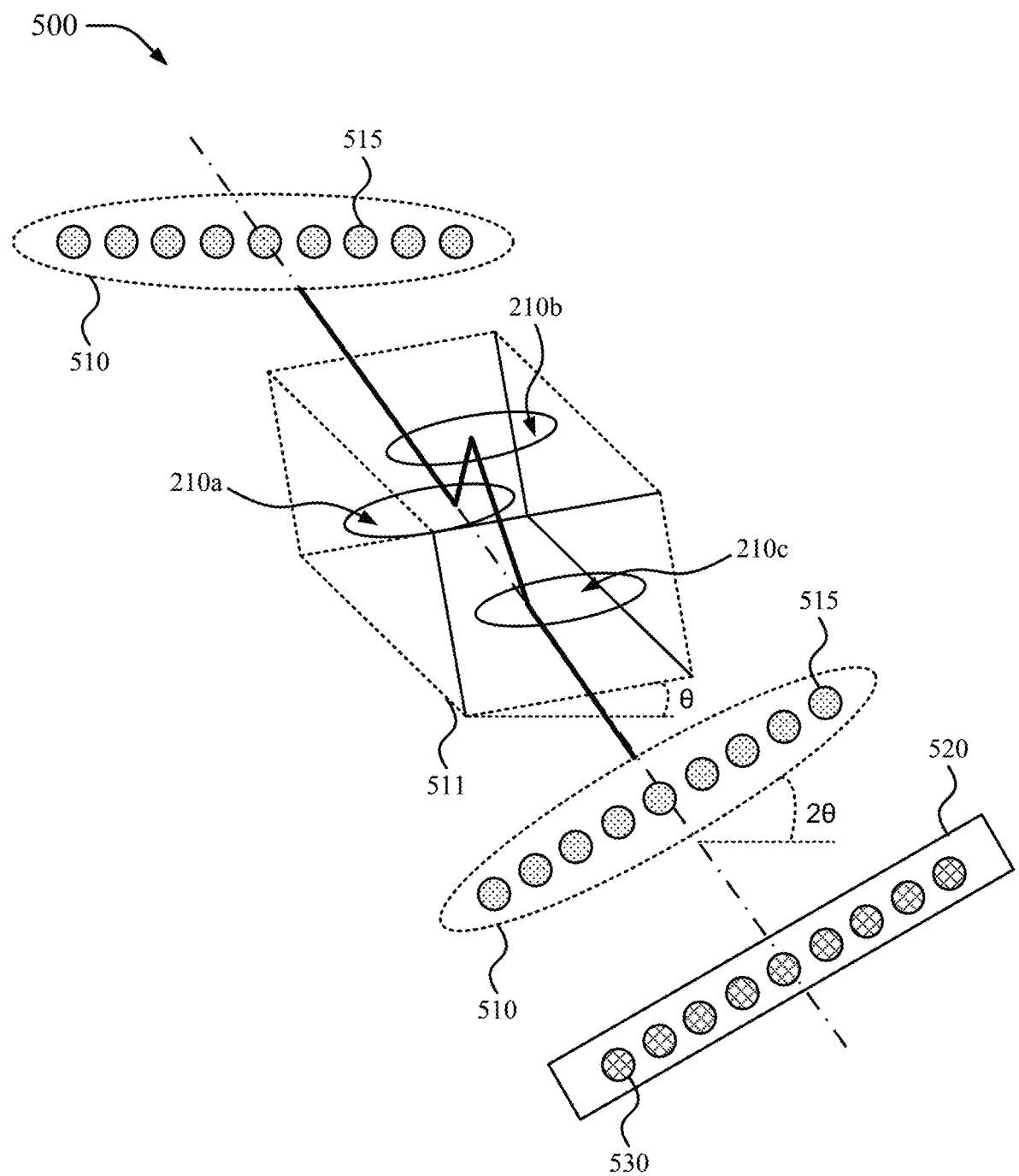
FIG. 5 illustrates an example of using the reflecting structures of FIG. 2 to rotate or tilt a linear array of laser beams for alignment with ions in a trap in accordance with aspects of the disclosure.

FIG. 5 illustrates an example of using the reflective elements of FIG. 2 to rotate or tilt a linear array of laser beams for alignment with ions in a ion trap in accordance with aspects of the disclosure. The type of QIP systems discussed above, where high-power UV laser beams are generally used and for which the refractive Dove prism 110 would present some drawbacks, may include multiple ions 530 arranged in a linear array 520 for performing various types of quantum operations and experiments. An example of such a QIP system is described in more detail below in connection with FIG. 6. To perform the operations and experiments, each of the ions 530 may be controlled, at least in part, by a corresponding laser beam 515. These laser beams are therefore also arranged in a linear array 510 to match the linear array of ions 520. When the linear array of laser beams 510 is not properly aligned to the linear array of ions 520, it may be necessary to adjust the rotation or tilt of the linear array of laser beams 510 to provide proper optical alignment.

As shown in the diagram 500, the reflecting structures 210a, 210b, and 210c may be used to provide just the right amount of tilt to the linear array of laser beams 510 to be optically aligned with the linear array of ions 520. In this example, the reflecting structures 210a, 210b, and 210c are part of a housing 511, which may be similar to the housing 310 in FIG. 3. In its initial orientation, the linear array of laser beams 510 has a 2θ offset from that of the linear array of ions 520. To provide the appropriate optical alignment and correct for the 2θ offset, the housing 511 with the reflecting structures 210a, 210b, and 210c may be rotated by θ by controlling the angle of rotation using, for example, the controller 410 and the rotation mechanism 420 described above.

Figure 6:
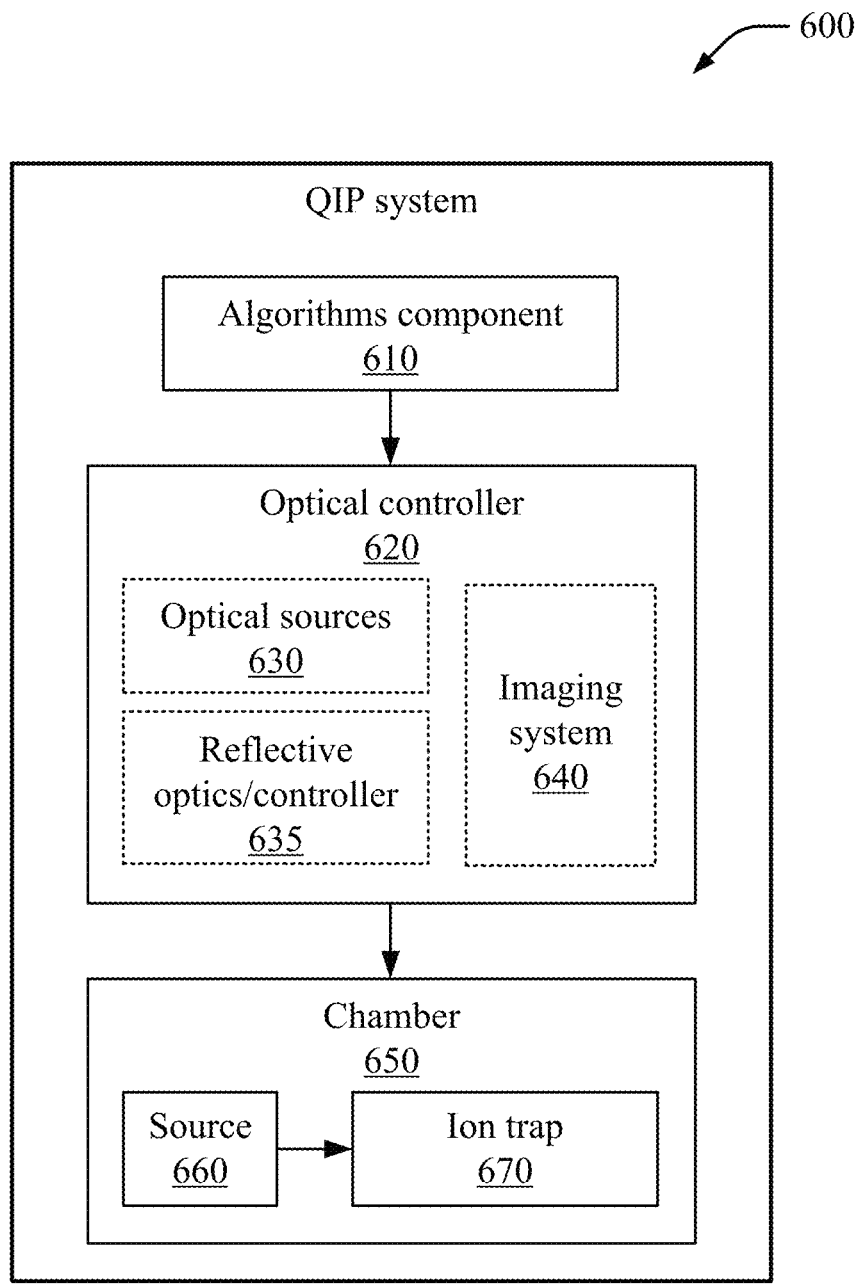
FIG. 6 is a block diagram that illustrates an example of a quantum information processing (QIP) system in accordance with aspects of this disclosure.

FIG. 6 is a block diagram that illustrates an example of a QIP system 600 in which optical alignment of laser beams may be used in accordance with aspects of this disclosure. The QIP system 600 may also be referred to as a quantum computing system, a computer device, a trapped ion system, or the like.

The QIP system 600 can include a source 660 that provides atomic species (e.g., a flux of neutral atoms) to a chamber 650 having an ion trap 670 that traps the atomic species once ionized (e.g., photoionized) by an optical controller 620. The ion trap 670 may be used to trap the ions 530 into the linear array of ions 520 shown in the diagram 500 in FIG. 5.

Optical sources 630 in the optical controller 620 may include one or more laser sources (e.g., sources of optical or laser beams) that can be used for ionization of the atomic species, control of the atomic ions, for fluorescence of the atomic ions that can be monitored and tracked by image processing algorithms operating in an imaging system 640 in the optical controller 620, and/or to perform the optical control functions. One or more of the optical sources 630 may be used to generate high-power UV laser beams. In an aspect, the optical sources 630 may be implemented separately from the optical controller 620. The optical source 630 may be used to generate and provide the linear array of laser beams 510 shown in the diagram 500 in FIG. 5, where this linear array of laser beams 510 may be rotated or tilted to optically align it to the linear array of ions 520 in the ion trap 670.

The optical controller 620 may include a reflective optics/controller 635 that may have reflecting structures such as the ones described in connection with the diagrams in FIGS. 2-5, including a housing to host the reflecting structures. The reflective optics/controller 635 may also include the controller 410 and the rotation mechanism 420, or similar devices.

The imaging system 640 can include a high resolution imager (e.g., CCD camera) for monitoring the atomic ions while they are being provided to the ion trap or after they have been provided to the ion trap 670. In an aspect, the imaging system 640 can be implemented separate from the optical controller 620, however, the use of fluorescence to detect, identify, and label atomic ions using image processing algorithms may need to be coordinated with the optical controller 620.

The QIP system 600 may also include an algorithms component 610 that may operate with other parts of the QIP system 600 (not shown) to perform quantum algorithms or quantum operations, including a stack or sequence of combinations of single qubit operations and/or multi-qubit operations (e.g., two-qubit operations) as well as extended quantum computations. As such, the algorithms component 610 may provide instructions to various components of the QIP system 600 (e.g., to the optical controller 620) to enable the implementation of the quantum algorithms or quantum operations.

Figure 7:
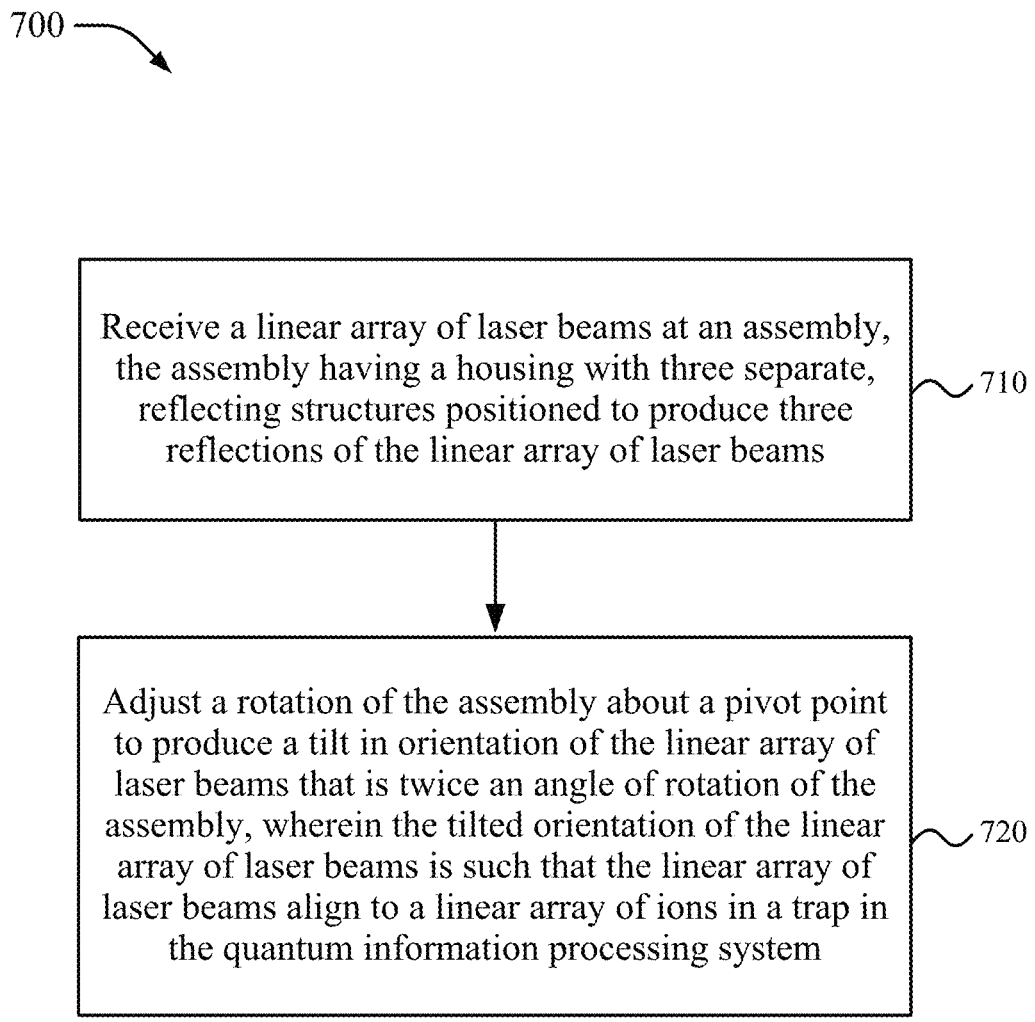
FIG. 7 is a flow diagram that illustrates an example of a method in accordance with aspects of this disclosure

Referring to FIG. 7, a method 700 for aligning laser beams in a trapped ion quantum information processing system is described. The functions of the method 700 may be performed by one or more components of a QIP system such as the QIP system 600 and its components (e.g., optical controller 620 and its subcomponents).

At 710, the method 700 includes receiving a linear array of laser beams (e.g., the linear array of laser beams 510) at an assembly, the assembly having a housing (e.g., the housing 310, the housing 511) with three separate, reflecting structures (e.g., the reflecting structures 210a, 210b, and 210c, the reflecting structures 320a, 320b, and 320c) positioned to produce three reflections of the linear array of laser beams.

At 720, the method 700 includes adjusting a rotation of the assembly about a pivot point to produce a tilt of the linear array of laser beams that is twice an angle of rotation of the assembly (e.g., see e.g., the diagram 500 in FIG. 5), wherein the tilted linear array of laser beams is such that the linear array of laser beams align to a linear array of ions in a trap in the quantum information processing system.

In connection with FIGS. 1-7 above, the present disclosure generally describes a system for optical alignment that includes an assembly having a housing with three separate, reflecting structures positioned to produce three reflections of one or more laser beams or one or more images, and a controller configured to control a rotation of the assembly about a pivot point to produce a tilt of the one or more lasers beams or the one or more images that is twice an angle of rotation of the assembly. The reflecting structures may be separate mirrors positioned at different locations of the housing. This optical alignment system may be used to align, for example, different types of optical or laser beams, including cylindrical beams.

In an aspect of this optical alignment system, the one or more laser beams include at least one UV laser beam, and each of the three reflecting structures is configured to reflect the UV laser beam without absorption of the UV laser beam.

In an aspect of this optical alignment system, the reflecting structures are positioned along a direction of propagation of the one or more laser beams.

In an aspect of this optical alignment system, a first reflecting structure and a third reflecting structure of the reflecting structures are angled or tilted with respect to a propagation axis of the one or more laser beams. The first reflecting structure and the third reflecting structure are angled with same but opposite tilts with respect to the propagation axis. The second reflecting structure is offset from the propagation axis.

In an aspect of this optical alignment system, the reflecting structures include a first mirror configured to receive the one or more laser beams and angled with respect to a propagation axis of the one or more laser beams, a second mirror configured to receive a reflection of the one or more laser beams from the first mirror, the second mirror being offset from the propagation axis, and a third mirror configured to receive a reflection of the one or more laser beams from the second mirror, the third mirror being angled with respect to the propagation axis, the first mirror and the third mirror being angled with same but opposite tilts.

In an aspect of this optical alignment system, the housing is made of one material and the reflecting structures are made of a different material.

In an aspect of this optical alignment system, the controller is configured to rotate the assembly about the pivot point by up to 90 degrees in at least one direction. Pivot rotations of 45 degrees may be enough for this application since they get converted to 90 degrees.

Also in connection with FIGS. 1-7 above, the present disclosure generally describes a system for aligning laser beams in a trapped ion quantum information processing system that includes optical sources configured to generate a linear array of laser beams, an assembly having a housing with three separate, reflecting structures positioned to produce three reflections of the linear array of laser beams, a controller configured to control a rotation of the assembly about a pivot point to produce a tilt of the linear array of laser beams that is twice an angle of rotation of the assembly, and a trap having a linear array of ions, wherein the tilted linear array of laser beams is such that the linear array of laser beams align to the linear array of ions. The reflecting structures may be separate mirrors positioned at different locations of the housing. This laser beams alignment system may be used to align, for example, different types of optical or laser beams, including cylindrical beams.

In an aspect of this laser beams alignment system, the linear array of laser beams include at least one UV laser beam, and each of the three reflecting structures is configured to reflect the UV laser beam without absorption of the UV laser beam.

In an aspect of this laser beams alignment system, the reflecting structures are positioned along a direction of propagation of the linear array of laser beams.

In an aspect of this laser beams alignment system, a first reflecting structure and a third reflecting structure of the reflecting structures are angled or tilted with respect to a propagation axis of the linear array of laser beams. The first reflecting structure and the third reflecting structure are angled with same but opposite tilts with respect to the propagation axis. The second reflecting structure is offset from the propagation axis.

In an aspect of this laser beams alignment system, the reflecting structures include a first mirror configured to receive the linear array of laser beams and angled with respect to a propagation axis of the linear array of laser beams, a second mirror configured to receive a reflection of the linear array of laser beams from the first mirror, the second mirror being offset from the propagation axis, and a third mirror configured to receive a reflection of the linear array of laser beams from the second mirror, the third mirror being angled with respect to the propagation axis, the first mirror and the third mirror being angled with same but opposite tilts.

In an aspect of this laser beams alignment system, the housing is made of one material and the reflecting structures are made of a different material.

In an aspect of this laser beams alignment system, the controller is configured to control the rotation of the assembly about the pivot point by up to 90 degrees in at least one direction. Pivot rotations of 45 degrees may be enough for this application since they get converted to 90 degrees.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A system for optical alignment, comprising:
   an assembly having a housing with three separate, reflecting structures positioned to produce three reflections of one or more laser beams or one or more images; and
   a controller configured to control a rotation of the assembly about a pivot point to produce a tilt of the one or more lasers beams or the one or more images that is twice an angle of rotation of the assembly.

2. The system of claim 1, wherein the reflecting structures are separate mirrors positioned at different locations of the housing.

3. The system of claim 1, wherein:
   the one or more laser beams include at least one ultraviolet (UV) laser beam, and
   each of the three reflecting structures is configured to reflect the at least one UV laser beam without absorption of the at least one UV laser beam.

4. The system of claim 1, wherein the reflecting structures are positioned along a direction of propagation of the one or more laser beams.

5. The system of claim 1, wherein a first reflecting structure and a third reflecting structure of the reflecting structures are angled with respect to a propagation axis of the one or more laser beams.

6. The system of claim 5, wherein the first reflecting structure and the third reflecting structure are angled with same but opposite tilts with respect to the propagation axis.

7. The system of claim 5, wherein a second reflecting structure of the reflecting structures is offset from the propagation axis.

8. The system of claim 1, wherein the reflecting structures include:
   a first mirror configured to receive the one or more laser beams and angled with respect to a propagation axis of the one or more laser beams;
   a second mirror configured to receive a first reflection of the one or more laser beams from the first mirror, the second mirror being offset from the propagation axis; and
   a third mirror configured to receive a second reflection of the one or more laser beams from the second mirror, the third mirror being angled with respect to the propagation axis, the first mirror and the third mirror being angled with same but opposite tilts.

9. The system of claim 1, wherein the housing is made of one material and the reflecting structures are made of a different material.

10. The system of claim 1, wherein the controller is configured to rotate the assembly about the pivot point by up to 90 degrees in at least one direction.

11. A system for aligning laser beams in a trapped ion quantum information processing system, comprising:
    optical sources configured to generate a linear array of laser beams;
    an assembly having a housing with three separate, reflecting structures positioned to produce three reflections of the linear array of laser beams;
    a controller configured to control a rotation of the assembly about a pivot point to produce a tilt of the linear array of laser beams that is twice an angle of rotation of the assembly; and a trap having a linear array of ions, wherein the tilted linear array of laser beams is such that the linear array of laser beams align to the linear array of ions.

12. The system of claim 11, wherein the reflecting structures are separate mirrors positioned at different locations of the housing.

13. The system of claim 11, wherein:
the linear array of laser beams include at least one ultraviolet (UV) laser beam, and
each of the three reflecting structures is configured to reflect the at least one UV laser beam without absorption of the at least one UV laser beam.

14. The system of claim 11, wherein the reflecting structures are positioned along a direction of propagation of the linear array of laser beams.

15. The system of claim 11, wherein a first reflecting structure and a third reflecting structure of the reflecting structures are angled with respect to a propagation axis of the linear array of laser beams.

16. The system of claim 15, wherein the first reflecting structure and the third reflecting structure are angled with same but opposite tilts with respect to the propagation axis.

17. The system of claim 15, wherein a second reflecting structure of the reflecting structures is offset from the propagation axis.

18. The system of claim 11, wherein the reflecting structures include:
a first mirror configured to receive the linear array of laser beams and angled with respect to a propagation axis of the linear array of laser beams;
a second mirror configured to receive a first reflection of the linear array of laser beams from the first mirror, the second mirror being offset from the propagation axis; and
a third mirror configured to receive a second reflection of the linear array of laser beams from the second mirror, the third mirror being angled with respect to the propagation axis, the first mirror and the third mirror being angled with same but opposite tilts.

19. The system of claim 11, wherein the housing is made of one material and the reflecting structures are made of a different material.

20. The system of claim 11, wherein the controller is configured to control the rotation of the assembly about the pivot point by up to 90 degrees in at least one direction.

21. A method for aligning laser beams in a trapped ion quantum information processing system, comprising:
receiving a linear array of laser beams at an assembly, the assembly having a housing with three separate, reflecting structures positioned to produce three reflections of the linear array of laser beams; and
adjusting a rotation of the assembly about a pivot point to produce a tilt of the linear array of laser beams that is twice an angle of rotation of the assembly, wherein the tilted linear array of laser beams is such that the linear array of laser beams align to a linear array of ions in a trap in the quantum information processing system.

* * * * *